United States Patent
Stacey et al.

(10) Patent No.: US 8,142,707 B2
(45) Date of Patent: Mar. 27, 2012

(54) APPARATUS FOR CURING A COMPOSITE LAMINATE

(75) Inventors: Paul S Stacey, Filton (GB); Stephen Williams, Filton (GB)

(73) Assignee: Airbus Operations Limited, Bristol (GB)

( * ) Notice: Subject to any disclaimer, the term of this patent is extended or adjusted under 35 U.S.C. 154(b) by 2058 days.

(21) Appl. No.: 10/539,286

(22) PCT Filed: Dec. 18, 2003

(86) PCT No.: PCT/GB03/05557
§ 371 (c)(1),
(2), (4) Date: Jun. 16, 2005

(87) PCT Pub. No.: WO2004/056546
PCT Pub. Date: Jul. 8, 2004

(65) Prior Publication Data
US 2006/0249885 A1    Nov. 9, 2006

(30) Foreign Application Priority Data

Dec. 23, 2002  (GB) .................................. 0230043.2

(51) Int. Cl.
*G01B 15/00* (2006.01)
(52) U.S. Cl. ........................................ 264/410; 264/406
(58) Field of Classification Search .................. 425/143; 700/198, 205; 264/406, 410
See application file for complete search history.

(56) References Cited

U.S. PATENT DOCUMENTS

| | | | |
|---|---|---|---|
| 4,463,437 A * | 7/1984 | Schenck et al. | ............... 702/134 |
| 4,515,545 A | 5/1985 | Thuen et al. | |
| 4,685,812 A | 8/1987 | Philippe et al. | |
| 4,818,118 A | 4/1989 | Bantel et al. | |
| 4,828,472 A | 5/1989 | Itoh et al. | |
| 4,874,948 A * | 10/1989 | Cielo et al. | .................. 250/341.5 |
| 5,209,881 A | 5/1993 | Charbonnet | |
| 5,345,397 A | 9/1994 | Handel et al. | |
| 5,730,817 A | 3/1998 | Feygin et al. | |
| 5,772,835 A | 6/1998 | Jordan et al. | |
| 6,132,084 A | 10/2000 | Bonissone et al. | |
| 6,512,207 B1 * | 1/2003 | Dress et al. | ................... 219/390 |
| 2001/0006264 A1 | 7/2001 | Lindhorst et al. | |

FOREIGN PATENT DOCUMENTS

| | | |
|---|---|---|
| DE | 29 40 031 A | 4/1981 |
| DE | 196 15 244 A | 10/1997 |
| EP | 0 099 993 A | 2/1984 |
| EP | 0 491 355 A | 6/1992 |
| EP | 0 534 092 A | 3/1993 |
| WO | WO 0051170 A1 * | 8/2000 |

OTHER PUBLICATIONS

International Search Report of PCT/GB03/05557, mailed Mar. 12, 2004.
GB Search Report of GB 0230043.2, dated Jun. 17, 2003.
EP Search Report of EP 02 25 8859, dated Feb. 10, 2003.

* cited by examiner

*Primary Examiner* — Christina Johnson
*Assistant Examiner* — Galen Hauth
(74) *Attorney, Agent, or Firm* — Nixon & Vanderhye P.C.

(57) ABSTRACT

An apparatus and method for controlling the curing process during the manufacture of composite laminates and components. The apparatus including a temperature controlled vessel such as an autoclave in which the material is placed during curing and an infra-red temperature measuring device such as a camera located remotely from the component to measure the temperature of at least part of the material during curing.

9 Claims, 3 Drawing Sheets

APPARATUS FOR CURING A COMPOSITE LAMINATE

This application is the US national phase of international application PCT/GB2003/005557, filed 18 Dec. 2003, which designated the U.S. and claims benefit of GB 0230043.2, dated 23 Dec. 2002, the entire contents of each of which are hereby incorporated by reference.

The present invention relates to the curing of composite materials for the manufacture of components and is particularly concerned with the control of the curing process.

Composite materials comprise fibres such as Carbon fibres, Glass fibres and Aramid fibres held in a variety of resin matrices. They are used to manufacture components for many applications and are especially common in the aerospace industry.

To form the composite material a chemical process by which the liquid resin cross-links to form a solid, known as curing, is undertaken. Curing generally takes place during component moulding although it can also take place at other stages of forming the component such as before or after moulding or commence during moulding and be completed after moulding. Curing of a component may require anything from a few seconds to several hours. Curing requires a reaction to take place in an applied system. In the aircraft industry components manufactured from composite materials require the reaction to occur at precisely controlled temperatures, (this may be room temperature or an elevated temperature), with or without pressure applied to consolidate the material.

Environmental conditions, including temperature distribution, have to be precisely controlled, to produce a uniform cure across the whole of the component. To allow the environment to be controlled curing takes place inside a temperature controlled vessel such as an oven or an autoclave (where pressure is also controlled). Other environmental conditions such as humidity may also be controlled. Controlling the temperature across the component is made more complex by design requirements that include relatively thick components and/or changes in the thickness of the composite material. These design requirements increase the difficulty in maintaining a constant temperature throughout the thickness of the composite material and at different points on the finished component. The differences in thickness across the component means that the material does not heat up and cool down evenly, leading to hot and/or cold spots.

To control the process and know when and where more or less heat should be applied to eliminate or moderate hot and cold spots the temperature across the component is monitored. Devices such as thermocouples attached to the component edge are used to monitor temperature. However, these devices will only read the local edge temperature and give no indication of the temperature in regions of the component away from a device, such as in the centre of the component or at an edge position where a device is not attached. It is often found that there are rapid or slow heating regions (hot or cold spots) in the centre of the component due to thinning or thickening of the composite in these regions. The placing of thermocouples centrally on a curing laminate in order to monitor such heat fluctuations is not possible because the devices mark the product and this is not acceptable. In fact it is unacceptable to place any device on the surface of the component away from the edge.

The difficulties explained above can be further compounded by requirements to control the cure across the component uniformly in a harsh environment, such as high temperature and pressure as experienced in an oven or autoclave.

It is an object of the present invention to provide a method of monitoring the temperature of the component across without contact with the surface.

According to a first aspect of the invention there is provided an apparatus for curing composite material including a temperature controlled vessel in which the material is placed during curing and an infra-red temperature measuring device located remotely from the component to measure the temperature of at least part of the material during curing.

The measuring device may send temperature information to a system for controlling the temperature of the vessel that processes the information and changes the temperature as necessary.

Using a remote temperature measuring device allows the temperature of the component to be measured at points away from the edges of the component without the risk of causing damage to the component. Thus allowing more data of the actual temperature being experienced by the component during cure to be collected and analysed and subsequently allowing the curing process to be more precisely controlled leading to a more accurate cure and thus a higher integrity component.

The measuring device may be located within the vessel or outside the vessel. Locating the device inside the vessel allows currently used autoclaves and ovens to be easily modified to take advantage of the benefits of the invention. New autoclaves and ovens can be designed and built in such a way to allow the device to be located outside the heating chamber but to still be able to detect the infra-red inside the chamber. The advantage of such designs is that the device does not have to be protected from the extremes of heat and pressure experienced in the chamber.

The temperature controlled vessel may be an autoclave or an oven, for example.

Preferably the infra-red temperature measuring device is a camera.

It is further preferred that the temperature across the whole of the material is monitored.

Monitoring the temperature across the whole area of the component allows for more accurate analysis and thus more accurate control of the curing process.

According to a second aspect of the invention there is provided a method for curing composite material including the steps of;

placing the material in a temperature controlled vessel and then, curing the material and during the curing monitoring the taking temperature readings and monitoring the temperature of at least part of the material using an infra-red device remote from the material.

The method may also include the step of processing the temperature readings and then adjusting the temperature of the vessel to maintain a constant curing temperature.

By way of example only one embodiment of the invention will now be described with reference to the following drawings in which—

Figure 1:
FIG. 1 is a view of a protective chamber for an infra-red camera.
Figure 2A:
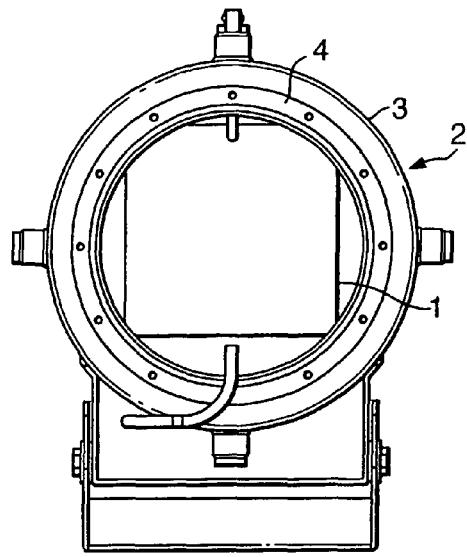
FIG. 2a is an end view of the chamber of FIG. 1.
Figure 2B:
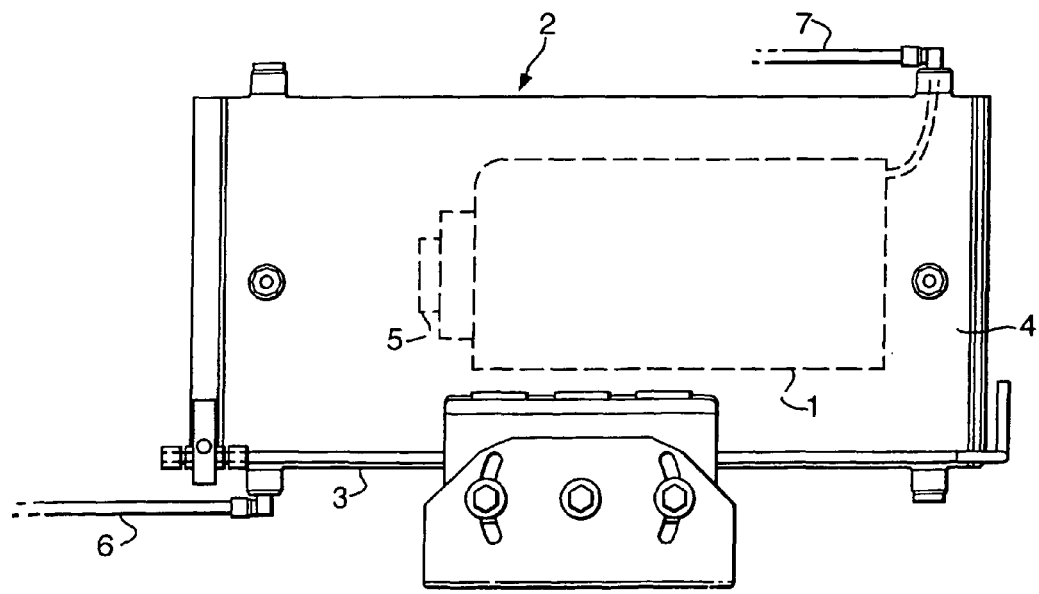
FIG. 2b is a side view of the chamber of FIG. 1.

As can be seen in FIGS. 2a and 2b, an infra-red camera 1 was placed in a protective chamber 2 to protect the camera 1 from the extremes of heat and temperature experienced within an autoclave that can typically be as high as 200° C. and $8 \times 10^5$ N/m² respectively. The chamber 2 is constructed as a twin walled 3, 4 stainless steel structure having a lens of Zinc Selenide 5. Zinc Selenide is used for the lens 5 because it is transparent to infra-red, unlike ordinary glass, and thus allows infra red to pass through to the detector within the camera 1. The lens 5 is made of a special crystal 12 mm thick that can withstand the temperatures and pressures experienced in the autoclave (not shown).

The chamber 2 is cooled by both water and air simultaneously to maintain the environment experienced by the camera 1 at acceptable temperature and pressure. To enable the chamber 2 to receive the cooling water, air, and data/camera control cables, an entry pipe 6 and an exit pipe 7 pass through the chamber 2 to the camera 1. Both pipes 6, 7 are constructed as flexible twin walled pipes creating an inner passage and a surrounding outer passage. The entry pipe 6 provides coolant in the form of air and water. The inner passage of the pipe 6 transports air into the chamber 2 to power air shutters and to ventilate cool air into the chamber 2. The outer passage of the pipe 6 acts as a water jacket transporting cooling water to the twin wall of the chamber. The exit pipe 7 is configured in the same way and removes the water (passing through the outer passage) and air (passing through the inner passage) when they have absorbed the heat. Cables also pass through the inner passage of the pipe 7 allowing the camera to be controlled and data to be passed to a control system.

The control system uses software to process the data received from the camera 1. This can be done in real time or at a later date. In real-time processing and analysing the data allows cure temperatures to be controlled and the temperature of the autoclave to be adjusted as necessary. By selecting specific points on the component to be cured to take readings from (usually points expected to be hot or cold spots) and directing the camera 1 to these points, the component temperature can be measured with considerable accuracy, allowing curing to be controlled very precisely.

The camera 1 can also be used to analyse the heating up and down characteristics of the autoclave prior to the autoclave being used for curing of components. Specific points in the autoclave can be monitored through a heating cycle (up and down) to see how quickly the temperature in the autoclave responds to changes in the heat provided. Thus the change in characteristics due to the introduction of tooling and/or support structures for individual components by thermally surveying such tools and supports using the camera can be analysed. The results of the analysis can be used in the control system software when assessing when and how to change the heat supplied to the autoclave once again improving precision and accuracy of the curing of a component and allowing heating potential to be maximised. An example of environmental properties that can be changed is the rate of airflow through the autoclave as well as the airflow temperature.

The cure process of composite materials can be subject to entrapment of air causing voids not normally visible to the manufacturer until after removal from cure and only visible when subject to Non destructive testing like C-Scan. The analysis carried out in real time using the above described system can be developed to allow inspection of composite components during curing and this can be incorporated into the cure process for the real time inspection of components.

The camera 1 maybe fixed in position or moveably mounted to allow larger structures to be monitored by one camera 1.

Figure 3:
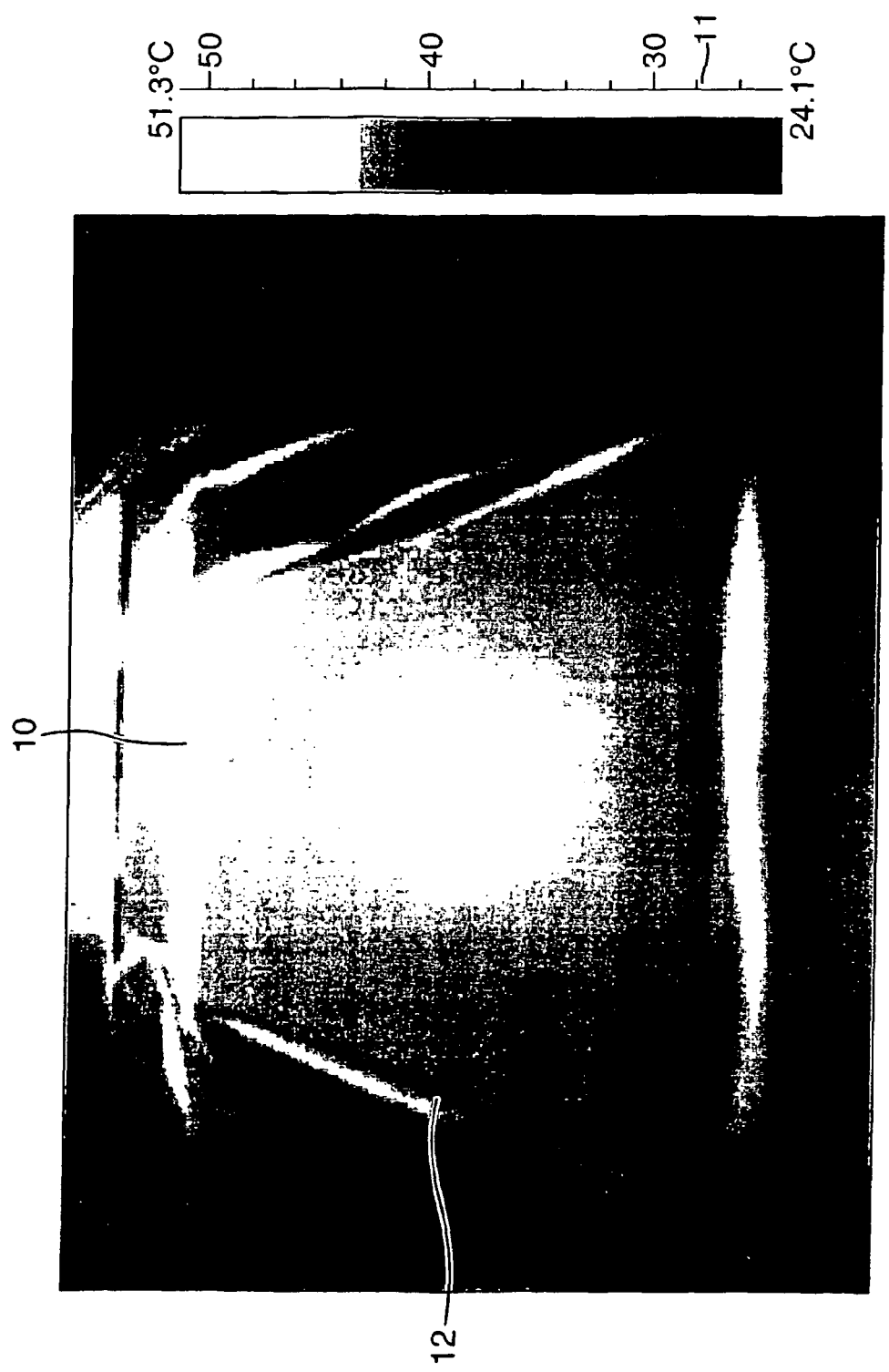
FIG. 3 shows the thermal mapping of a test laminate analysed using the apparatus and method of this invention.

FIG. 3 shows a view of an initial test laminate 10 within an autoclave. The shading of the view indicates the differences in temperature across the laminate 10. Cooler spots show up as lighter shades and hotterspots as darker shades as indicated by the temperature key 11. As can be seen the edge of the laminate 12 is cooler than the rest of the laminate 10.

The invention claimed is:

1. A method for curing composite material including the steps of;
    placing the material in a temperature controlled vessel and then,
    curing the material and during the curing monitoring the taking of temperature readings and monitoring of the temperature of at least part of the material using an infra-red device remote from the material, and
    processing the temperature readings and then adjusting the temperature of the vessel to maintain a constant curing temperature, including the step of monitoring the temperature of the material to determine the location and existence of voids during curing.

2. A method for curing composite material, said method including the steps of:
    placing the material in a temperature controlled vessel;
    curing the material;
    during said curing step, monitoring the temperature of at least part of the material using an infra-red device remote from the material; and
    adjusting the temperature of the vessel to maintain a constant curing temperature, including the step of monitoring the temperature of the material to determine the location and existence of voids during curing.

3. A method for curing composite material as claimed in claim 2 including the step of locating said infra-red device outside the vessel.

4. A method for curing composite material as claimed in claim 2 wherein the temperature controlled vessel is an autoclave.

5. A method for curing composite material as claimed in claim 2 wherein the infra-red temperature measuring device is a camera.

6. A method for curing composite material as claimed in claim 2 wherein said monitoring step includes monitoring the temperature across the whole of the material.

7. A method for curing composite material as claimed in claim 5, wherein said camera for monitoring the temperature across the whole of the material is moveably mounted for allowing larger structures to be monitored by one camera.

8. A method for curing composite material as claimed in claim 5, wherein said method includes the steps of:
    selecting specific points on the component for taking readings; and
    directing said camera to the selected specific points.

9. A method for curing composite material as claimed in claim 2, wherein said method includes the step of monitoring the temperature of the vessel prior to and during curing of the material.

* * * * *